Nov. 17, 1931.  H. M. HESSENBRUCH  1,832,390
LAWN MOWER
Filed Feb. 1, 1929
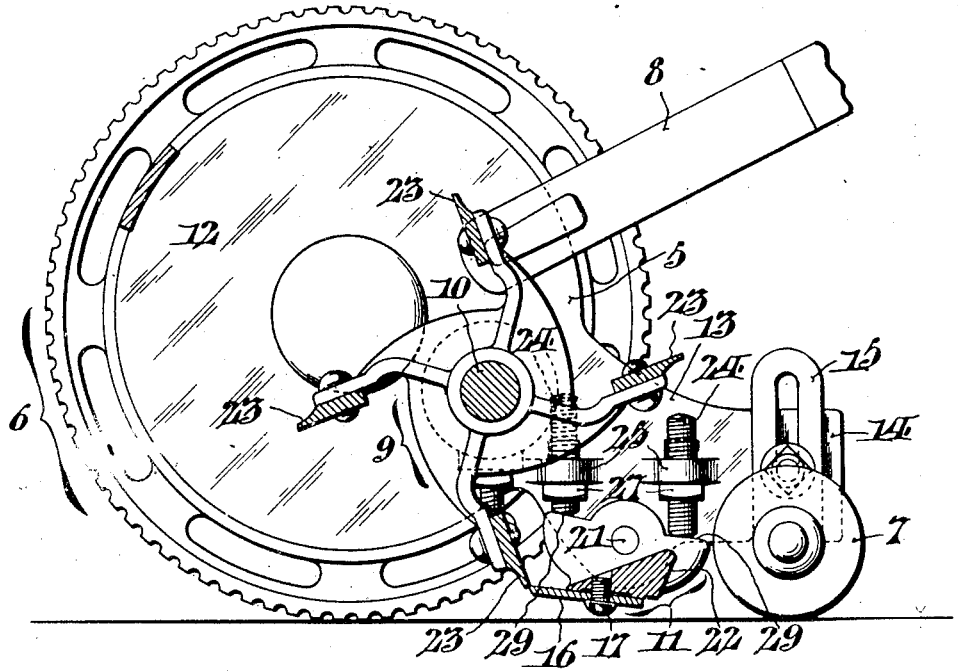
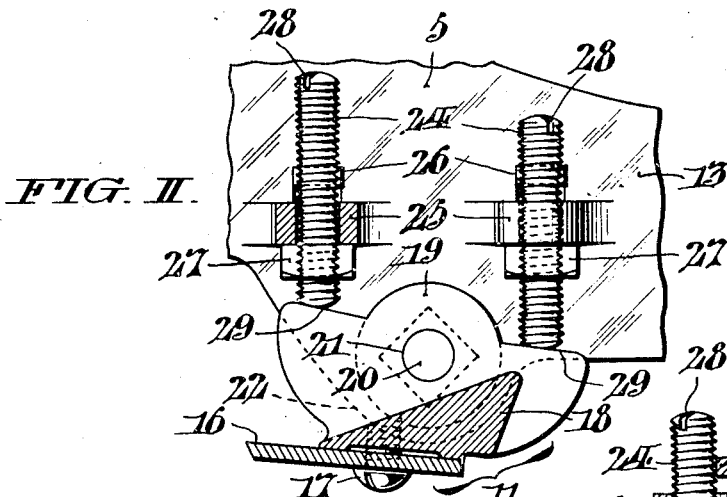
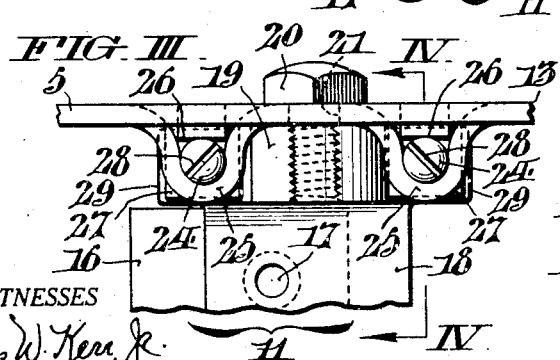
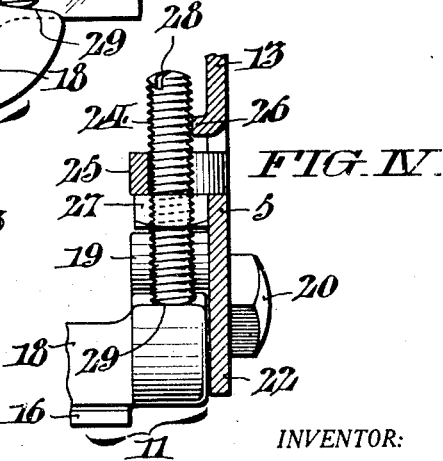
INVENTOR:
Hermann M. Hessenbruch
BY Fraley Paul
ATTORNEYS.

Patented Nov. 17, 1931

1,832,390

UNITED STATES PATENT OFFICE

HERMANN M. HESSENBRUCH, OF WYNNEWOOD, PENNSYLVANIA, ASSIGNOR TO PHILADELPHIA LAWN MOWER COMPANY INC., OF PHILADELPHIA, PENNSYLVANIA, A CORPORATION OF PENNSYLVANIA

LAWN MOWER

Application filed February 1, 1929. Serial No. 336,843.

This invention relates to lawn mowers, and it has more particular reference to that type of machine comprising side frames, between which a rotary cutting-reel with a cooperative stationary knife are located to effect the mowing operation. In such machines the stationary knife is usually rockably pivoted between the side frames, with capacity for angular adjustment toward—or away from—the rotary cutting-reel by means of adjuster screws, afforded support or guidance in lateral abutments of said side frames; while the screws also serve to lock the stationary knife at the requisite adjustment.

The present invention has for its primary object the provision of an improved side-plate structure which affords a novel form of free or "non-tapped" guidance for the stationary knife adjuster screws, whereby they are maintained in proper position, or axially parallel to said side-plates.

Another object is to furnish a means of the type stated in the preceding paragraph which is more particularly—although not essentially—adapted to lawn mowers having sheet metal side frames or plates.

Other objects and advantages of the instant invention will be apparent from the following detailed description, when considered in conjunction with the accompanying sheet of explanatory drawings; while the appended claims serve to define those features deemed novel in the art.

In the drawings:—

Fig. I is a transverse sectional-view through a lawn mower embodying my novel stationary knife adjuster-screw guidance means.

Fig. II is a relatively enlarged fragmentary detail elevation of the novel means constituting this invention, as viewed at one inner side of the lawn mower.

Fig. III is a top plan view of the preceding illustration; and,

Fig. IV is a sectional view, taken on the plane indicated by arrows IV—IV in Fig. III.

Referring more in detail to the drawings, the reference numeral 5 designates one of the customary side plates of a lawn mower, 6 a ground or supporting wheel, 7 the customary back roller, and 8 a broken portion of one of the usual handle-fork components. The rotary cutting-reel is comprehensively indicated by the numeral 9, and 10 is the axis or shaft thereof; while the stationary knife will, hereinafter, be generally referred to as 11. The parts thus far described are shown and briefly referred to for reasons that will later on be more apparent, and, with the exception of the side plate 5, they do not enter into this invention other than as subsidiary combination elements.

In accordance with the instant improvements, and as best appreciated from Figs. II, III and IV, each side plate 5 is conveniently fabricated of sheet-steel suitably configured to provide a substantially discous section 12, with a co-planar irregularly-shaped extension 13 having an angled end 14 serving as a guide flange for the slotted bearing support 15 of the back roller 7.

The stationary knife blade 16 is removably secured—in the machine illustrated—by one or more screws 17, to a "back" 18 having an apertured rocker 19 at each end, for engagement by the screw-threaded shank of a stud 20, afforded pivotal bearing at 21 in the downwardly directed lug 22, of the side plate extension 13, aforesaid.

Adjustment of the stationary knife 11 in an upward or downward direction, relative to the spiral blades 23 of the rotary cutting-reel 9, is controlled by means of vertically-disposed longitudinally-movable adjuster or stop-screws 24, which have free guidance in integral abutment loops or straps 25 pressed, expanded or otherwise formed, out of the extension 13. These loops or abutments 25 are preferably located on the inner face of the side plate 5, and they are of a transverse dimension to semi-disengagingly embrace the stop-screws 24, as will be well understood from Figs. III and IV, more particularly. In addition to providing the abutment loops or straps 25, as guidance for the stop-screws 24, I also stamp out, or otherwise form, in conjunction with each said strap, a horizontally-directed protuberance or tongue 26, which is of a dimension to keep the associated screw 24 in vertical position or axially parallel with the side plate extension 13. These protuberances or tongues 26 are conveniently pressed out of—or bent out from—the side extensions 13 medially above the apertures caused by formative severance of the abutment loops or straps 25 therefrom; as will be readily understood by those acquainted with the sheet metal arts.

Beneath the loops or straps 25, each stop-screw 24 is fitted with a threadedly-engaging nut 27, while said screws are cross-cut at 28 for application of an ordinary screw-driver. Incidentally, the nuts 27 are of a shape and size to present one flat side or face thereof in close proximity to the extension 13, so as to effectively prevent rotation of said nuts.

The lower ends of the stop-screws 24 abut the flanking ledge portions 29 of the back rocker sections 19 to thereby limit movement of the stationary knife 11; and it will be apparent that, when one of said screws is driven down, the nut 27 thereon will be "jammed" against the underface of the associated abutment loop or strap 25, in a manner which effectively locks the knife blade 16 at the requisite adjustment relative to the spiral cutters 23, of the rotary reel 9, when the other screw 24 is opposedly driven. It will, therefore, be readily understood that when both stop-screws 24 are driven "home" tightly, the stationary knife 11 is rigidly held at whatever adjustment it may be desired to "set" it; and that the nuts 27 thereon constitute locking means, to a greater or lesser degree, which firmly retain said adjustment in permanent position.

Although I have described my invention in connection with lawn mower side plates 5 made of pressed sheet steel, it will be obvious that it is equally adaptable to other classes of material. For example, if the side plates 5 be of cast metal, the abutment loops or straps 25, as well as the tongues or projections 26 would be integrally formed therein, and simply allocated or proportioned in the manner set forth, so as to hold the stop-screws 24 in erect attitude.

From the foregoing it is thought that the merits and advantages of my present invention will be clear and self-evident, while it is also practical and efficient, as well as a meritorious and economic advance in the art.

Having thus described my invention, what I claim is:—

1. In a lawn mower having a stationary knife, the combination of elements providing pivotal support therefor, each such element having apertured abutments with companion projections, screws engaging the stationary knife at opposite sides of its pivot, said screws being afforded guidance in the abutments with capacity for free longitudinal movement and maintenance in proper alignment by the companion projections, and nuts on the screws below the abutments each having a flat face co-acting with the elements aforesaid to hold said nuts against rotation.

2. In a lawn mower having a stationary knife, the combination of side plates providing pivotal support therefor, each side plate having integral apertured abutments with companion superjacent projections, screws engaging the stationary knife at opposite sides of its pivot, said screws being afforded guidance in the abutments with capacity for free longitudinal movement and maintenance in proper alignment by the projections, and nuts on the screws below the abutments each having a flat face co-acting with the elements aforesaid to hold said nuts against rotation.

3. In a lawn mower having a stationary knife, the combination of sheet metal side plates providing pivotal support therefor, each side plate having abutment straps with companion superjacent projections expanded from said side plate, adjuster screws engaging the stationary knife at opposite sides of its pivot, said screws having guidance in the abutment straps with capacity for free longitudinal movement and retention in parallelism to the side plates by the projections aforesaid, and nuts on the screws below the abutments each having a flat face co-acting with the elements aforesaid to hold said nuts against rotation.

4. In a lawn mower having a stationary knife, the combination of sheet metal side plates providing pivotal support therefor, each side plate having spaced vertically-directed abutment straps with companion medially-located superjacent horizontal projections respectively expanded out of and bent from said side plate, adjuster screws engaging the stationary knife at opposite sides of its pivot, said screws having guidance in the abutment straps with capacity for free longitudinal movement and maintenance in parallelism to the side plates by the projections aforesaid, and a nut on each screw below the abutments each having a flat face co-acting with the elements aforesaid to hold said nuts against rotation.

5. As an article of manufacture a side plate for lawn mowers having apertured abutments and superjacent companion projections expanded out of said side plate.

6. As an article of manufacture a sheet metal side plate for lawn mowers having spaced vertically-directed abutment straps with companion medially-located superjacent horizontal projections respectively expanded out of and bent from said side plate.

In testimony whereof, I have hereunto signed my name at Philadelphia, Pennsylvania, this 29th day of January, 1929.

HERMANN M. HESSENBRUCH.